US008141684B2

(12) United States Patent
Björni et al.

(10) Patent No.: US 8,141,684 B2
(45) **Date of Patent: *Mar. 27, 2012**

(54) METHOD FOR INSTALLING AN ELEVATOR, AND ELEVATOR

(75) Inventors: Osmo Björni, Hyvinkää (FI); Esko Aulanko, Kerava (FI); Teuvo Väntänen, Hyvinkää (FI); Jorma Mustalahti, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/407,889

(22) Filed: Apr. 21, 2006

(65) Prior Publication Data

US 2006/0243531 A1 Nov. 2, 2006

(30) Foreign Application Priority Data

Nov. 17, 2003 (FI) .................................... 20031664
Nov. 9, 2004 (WO) .................. PCT/FI2004/000659

(51) Int. Cl.
*B66B 7/10* (2006.01)
*B66B 19/02* (2006.01)
*B66B 11/08* (2006.01)
*B23P 11/00* (2006.01)
*E04G 21/00* (2006.01)

(52) U.S. Cl. ........ 187/264; 187/254; 187/266; 187/900; 29/429; 52/741.1

(58) Field of Classification Search .................. 187/254, 187/266, 401, 900; 29/428–429; 52/30, 52/745.02, 745.04, 745.19, 745.2; *B66B 7/06, B66B 7/10, 11/08, 19/02, 19/04*
See application file for complete search history.

(56) References Cited

U.S. PATENT DOCUMENTS

| | | | | |
|---|---|---|---|---|
| 12,640 | A * | 4/1855 | Murtaugh | 187/251 |
| 216,568 | A * | 6/1879 | Holske | 187/251 |
| 3,298,462 | A * | 1/1967 | Morris | 187/262 |
| 3,851,736 | A * | 12/1974 | Westlake et al. | 52/745.2 |
| 4,231,148 | A | 11/1980 | Harding | |
| 4,345,671 | A | 8/1982 | Tosato et al. | |
| 4,502,570 | A | 3/1985 | Westerlund | |
| 5,000,292 | A | 3/1991 | Chapelain et al. | |

(Continued)

FOREIGN PATENT DOCUMENTS

DE 25 06 670 10/1975

(Continued)

OTHER PUBLICATIONS

Finnish Search Report from FI 20031664.

(Continued)

*Primary Examiner* — Michael Mansen
*Assistant Examiner* — Stefan Kruer
(74) *Attorney, Agent, or Firm* — Harness, Dickey & Pierce, P.L.C.

(57) ABSTRACT

An elevator, preferably an elevator without counterweight, comprising a number of diverting pulleys in the upper part of an elevator shaft or equivalent, a number of diverting pulleys in the lower part of the elevator shaft and a number of diverting pulleys on an elevator car, is installed in such manner that at least some of the diverting pulleys for the upper part are rigged in the lower part of the elevator shaft and at least some of the diverting pulleys from which the passage of the ropes is directed upwards are rigged at the same time. The diverting pulleys for the upper part thus rigged are raised in the rigged state to the upper part of the elevator shaft or equivalent and mounted in place.

24 Claims, 7 Drawing Sheets

U.S. PATENT DOCUMENTS

Figure 1:
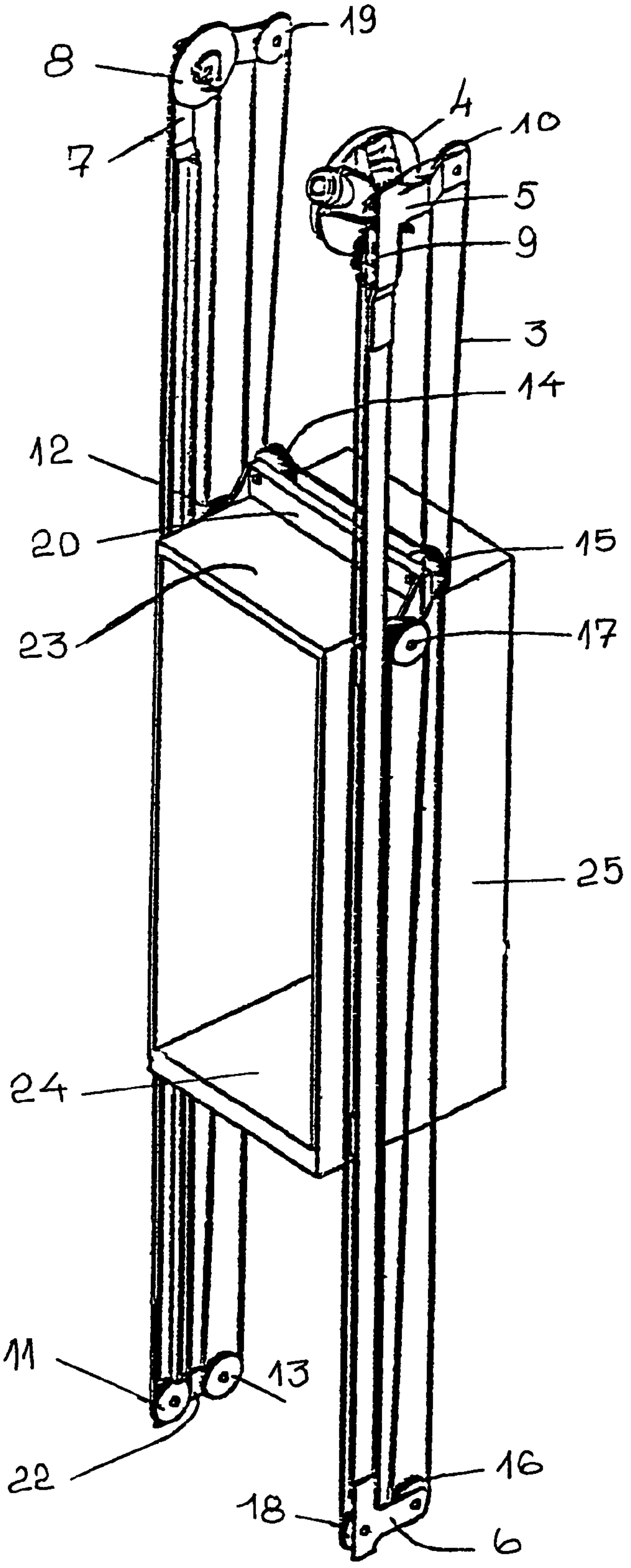

| | | | | |
|---|---|---|---|---|
| 5,014,822 | A * | 5/1991 | Chapelain et al. | 187/408 |
| 5,065,843 | A * | 11/1991 | Richards | 187/408 |
| 5,553,686 | A * | 9/1996 | Jensen | 187/408 |
| 5,944,144 | A | 8/1999 | Hein | |
| 6,193,017 | B1 | 2/2001 | Köster | |
| 6,234,276 | B1 * | 5/2001 | Wagatsuma et al. | 187/411 |
| 6,425,463 | B1 * | 7/2002 | Broyan | 187/411 |
| 6,446,763 | B1 | 9/2002 | Glassey et al. | |
| 6,471,012 | B2 * | 10/2002 | Faletto | 187/256 |
| 6,491,136 | B2 * | 12/2002 | Kobayashi et al. | 187/254 |
| 6,533,077 | B1 * | 3/2003 | Glassey | 187/411 |
| 6,672,013 | B1 * | 1/2004 | Glassey et al. | 52/30 |
| 7,207,421 | B2 | 4/2007 | Aulanko et al. | |
| 7,481,299 | B2 | 1/2009 | Mustalahti et al. | |
| 7,481,300 | B2 | 1/2009 | Aulanko et al. | |
| 7,484,596 | B2 | 2/2009 | Aulanko et al. | |
| 7,562,744 | B2 | 7/2009 | Mustalahti et al. | |
| 7,650,972 | B2 | 1/2010 | Aulanko et al. | |
| 7,802,658 | B2 | 9/2010 | Aulanko et al. | |
| 8,020,670 | B2 | 9/2011 | Mustalahti et al. | |
| 2002/0066622 | A1 | 6/2002 | Pettersson et al. | |
| 2005/0217944 | A1 | 10/2005 | Aulanko et al. | |
| 2005/0224301 | A1 * | 10/2005 | Aulanko et al. | 187/406 |
| 2005/0284705 | A1 | 12/2005 | Aulanko et al. | |
| 2006/0231347 | A1 | 10/2006 | Mustalahti et al. | |
| 2006/0243530 | A1 * | 11/2006 | Aulanko et al. | 187/260 |
| 2006/0243531 | A1 | 11/2006 | Bjorni et al. | |
| 2006/0243532 | A1 | 11/2006 | Aulanko et al. | |
| 2007/0017750 | A1 * | 1/2007 | Mustalahti et al. | 187/254 |

FOREIGN PATENT DOCUMENTS

| | | | |
|---|---|---|---|
| EP | 0375208 | A1 | 12/1989 |
| EP | 0375208 | | 6/1990 |
| EP | 0631968 | A2 | 6/1994 |
| EP | 0631967 | A2 | 1/1995 |
| EP | 1122203 | A1 * | 8/2001 |
| EP | 1380532 | A1 | 1/2004 |
| FR | 2823734 | A1 * | 10/2002 |
| FR | 2921913 | | 4/2009 |
| GB | 1 442 584 | | 7/1976 |
| JP | 57-24313 | | 5/1982 |
| JP | 58-41275 | | 9/1983 |
| JP | 1-261189 | | 10/1989 |
| JP | 2-225280 | | 9/1990 |
| JP | 2513183 | | 7/1996 |
| JP | 2000-247560 | A | 9/2000 |
| JP | 2001-302139 | | 10/2001 |
| JP | 2003-128359 | | 5/2003 |
| JP | 2007230662 | A * | 9/2007 |
| WO | WO 98/06655 | A1 | 2/1998 |
| WO | WO 01/44096 | A1 | 12/2000 |
| WO | WO 2004/041701 | A1 | 5/2004 |
| WO | WO 2004/067429 | | 8/2004 |
| WO | WO 2005/090217 | | 9/2005 |

OTHER PUBLICATIONS

Transmittal of Application (PCT/IB/311).
International Search Report (PCT/ISA/220, PCT/ISA/210), Written Opinion (PCT/ISA/237).
"The Mystery in Munich", J. Gale, Elevator World, vol. 45, No. 7, Elevator World Inc., Jul. 1997, Birmingham, AL, US, pp. 59-68.
Japanese Office Action dated Nov. 9, 2010 issued in corresponding Japanese Application No. 2006-540475 (English translation only).
English Translation of Japanese Office Action mailed on Sep. 7, 2010.
Office Action for U.S. Appl. No. 11/393,896 dated Aug. 31, 2010.
Office Action for U.S. Appl. No. 11/393,896 dated Mar. 1, 2010.
Office Action for U.S. Appl. No. 11/393,896 dated Sep. 16, 2009.
Office Action for U.S. Appl. No. 11/393,896 dated Apr. 1, 2009.
Office Action for U.S. Appl. No. 11/393,896 dated Sep. 4, 2008.
Office Action for U.S. Appl. No. 11/393,896 dated Feb. 22, 2008.
Office Action for U.S. Appl. No. 11/393,896 dated Sep. 14, 2007.
Office Action for U.S. Appl. No. 11/393,896 dated Mar. 14, 2007.
Notice of Allowance for U.S. Appl. No. 11/505,976 dated Mar. 16, 2009.
Office Action for U.S. Appl. No. 11/505,976 dated Apr. 30, 2008.
Office Action for U.S. Appl. No. 11/505,976 dated Dec. 10, 2007.
Office Action for U.S. Appl. No. 11/505,976 dated May 22, 2007.
US Office Action dated Feb. 3, 2011, issued in Co-Pending U.S. Appl. No. 11/393,896.
Notice of Allowance dated Oct. 17, 2011, issued in Co-Pending U.S. Appl. No. 11/393,896.

* cited by examiner

METHOD FOR INSTALLING AN ELEVATOR, AND ELEVATOR

CROSS-REFERENCE TO RELATED APPLICATIONS

This application is a continuation of International Application No. PCT/FI2004/000659, filed on Nov. 9, 2004, in the Receiving Office of the National Board of Patents and Registration of Finland ("NBPRF"), and claims priority from that application and Finnish Patent Application No. 20031664, filed on Nov. 17, 2003, in the NBPRF.

The present invention relates to a method for installing an elevator, to an elevator installed by the method, and to an elevator more generally.

One of the objectives in elevator development work is to achieve an efficient and economical utilization of building space. In recent years, this development work has produced various elevator solutions without machine room, among other things. Good examples of elevators without machine room are disclosed in specifications EP 0 631 967 (A1) and EP 0 631 968. The elevators described in these specifications are fairly efficient in respect of space utilization as they have made it possible to eliminate the space required by the elevator machine room in the building without a need to enlarge the elevator shaft. In the elevators disclosed in these specifications, the machine is compact at least in one direction, but in other directions it may have much larger dimensions than a conventional elevator machine.

In these basically good elevator solutions, the space required by the hoisting machine limits the freedom of choice in elevator lay-out solutions. Some space is needed to provide for the passage of the hoisting ropes. It is difficult to reduce the space required by the elevator car itself on its track and likewise the space required by the counterweight, at least at a reasonable cost and without impairing the performance and operational quality of the elevator. In the case of a traction sheave elevator without machine room, mounting the hoisting machine in the elevator shaft is difficult, especially in a solution with machine above, because the hoisting machine is an object of fairly large size and weight. Especially in the case of larger loads, speeds and/or hoisting heights, the size and weight of the machine are a problem regarding installation, even so much so that the required machine size and weight have in practice limited the sphere of application of the concept of elevator without machine room or at least retarded the introduction of said concept in larger elevators. In modernization of elevators, the space available in the elevator shaft has often limited the sphere of application of the concept of elevator without machine room. Often, especially when hydraulic elevators have had to be modernized or replaced, it has not been practical to apply a roped elevator solution without machine room due to insufficient space in the elevator shaft, particularly when no counterweight has been used in the hydraulic elevator solution to be modernized/replaced. The drawbacks of elevators with counterweight are the cost of the counterweight and the space required for the counterweight in the elevator shaft. Drum driven elevators, which are nowadays rather seldom installed, have the drawbacks of heavy and complicated hoisting machines and their large power and/or torque requirement. Prior-art elevators without counterweight are exotic and no proper solutions are known. So far it has not been technically or economically reasonable to make elevators without counterweight. One solution like this is disclosed in specification WO9806655. The recent international patent application PCT/FI03/00818 discloses a feasible elevator solution without counterweight differing from prior-art solutions. In prior-art elevator solutions without counterweight, the tensioning of the hoisting rope is implemented using a weight or spring, and that is not an attractive approach to implementing the tensioning of the hoisting rope. Another problem with elevators without counterweight, when long ropes are used e.g. due to a large hoisting height or large suspension ratios used, the compensation of rope elongations and at the same time the friction between the traction sheave and the hoisting ropes is insufficient for the operation of the elevator. In the case of a hydraulic elevator, especially a hydraulic elevator with lifting power applied from below, the shaft efficiency, i.e. the ratio of the cross-sectional shaft area taken up by the elevator car to the total cross-sectional area of the elevator shaft, is fairly high. This has traditionally been a significant reason why expressly a hydraulic elevator has been selected for a building. On the other hand, hydraulic elevators have many drawbacks related to their lifting principle and use of oil. Hydraulic elevators have a high energy consumption, a possible leakage of oil from the equipment is an environmental hazard, the periodically required oil change involves a high cost, even an elevator installation in good condition causes olfactory disadvantages as small amounts of oil escape into the elevator shaft or machine room and from there further to other parts of the building and into the environment and so on. Due to the shaft efficiency of a hydraulic elevator, modernization of the elevator by replacing it with another type of elevator that would allow the drawbacks of the hydraulic elevator to be avoided but would necessitate the use of a smaller elevator car is not an attractive solution to the owner of the elevator. Hydraulic elevators also have small machine spaces, which may be located at a distance from the elevator shaft, making it difficult to change the elevator type.

There are very large numbers of traction sheave elevators installed and in use. They were made at their time to meet the proposed needs of users and the intended uses of the buildings concerned. Later, both user needs and the practical requirements of the buildings have changed in many cases and an old traction sheave elevator may have become insufficient in respect of size of the elevator car or in other respects. For example, older elevators of a rather small size are not necessarily suited for transporting perambulators or roller chairs. On the other hand, in older buildings that have been converted from residential use to office or other use, the originally installed smaller elevator is no longer sufficient in capacity. As is known, increasing the size of such a traction sheave elevator is practically impossible because the elevator car and counterweight already fill the cross-sectional area of the elevator shaft and the car can not be reasonably enlarged.

The general aim of the invention is to achieve at least one the following objectives. An objective of the invention is develop the elevator without machine room so as to achieve more efficient space utilization in the building and in the elevator shaft than before. This means that the elevator should permit of being installed in a relatively narrow elevator shaft if necessary. One objective is to achieve an elevator in which the elevator hoisting rope has a good hold/grip on the traction sheave. A further objective of the invention is to create an elevator solution without counterweight without compromising on the properties of the elevator. It is also an objective to eliminate the undesirable effects of rope elongations. An additional objective of the invention is to achieve a more efficient utilization of the elevator shaft spaces above and below the elevator car than before in the case of elevators without counterweight. A specific objective is to create an effective method of installing a traction sheave elevator without counterweight in an elevator shaft.

The objective or objectives of the invention should be achieved without compromising on the possibility of varying the basic layout of the elevator.

Embodiments of the method for installing an elevator, the elevator installed by the method, and the elevator more generally are disclosed below. The inventive content disclosed in the application can be defined in other ways than is done in the claims below. The inventive content may also consist of several separate inventions, especially if the invention is considered in the light of explicit or implicit sub-tasks or in respect of advantages or sets of advantages achieved. The features of different embodiments and applications of the invention may also be combined in other ways in addition to those described here. Some of the attributes contained in the claims below may be superfluous from the point of view of separate inventive concepts.

By applying the invention, one or more of the following advantages, among others, can be achieved:

- the invention enables a simple manner of installing an elevator while also reducing the installation time; the installation time is shortened and the total installation costs are reduced
- so-called “one-man installation” becomes possible for a significant portion of the installation time or even for the entire installation work, so the progress of the installation work is not retarded by waiting times incurred when several persons are working together; a saving on installation time of up to one third can be achieved;
- as the car is only installed after the rigging of the ropes and construction of a possible car frame, most of the work associated with the rigging and the car frame can be carried out from the bottom of the shaft, where no risk of falling is present; also, the use of the car during the later stages of installation allows faster installation and improves work safety
- in the elevator of the invention, no separate steel structures reducing the shaft space above the elevator car need to be provided at the upper end of the elevator shaft
- no space is required below the elevator car at the lower end of the elevator shaft for rope wheels or other devices needed for suspension, and consequently a shallow pit at the lower end of the elevator shaft is sufficient
- in the elevator of the invention, no rope portions going upwards or downwards and no diverting pulleys are needed in the parts directly above and below the elevator car because the transverse passages of the hoisting ropes take place on the elevator car, so the spaces required above and below the elevator can be made shallow
- in the elevator of the invention, the horizontal rope portions of the hoisting ropes have been arranged in conjunction with the elevator car, preferably inside a transverse beam comprised in the elevator car, thus avoiding transverse passages of hoisting ropes in the upper or lower parts of the elevator shaft, which allows the space directly above or below the elevator car to be made shallow
- in the elevator of the invention, the horizontal rope portions of the hoisting ropes have been arranged in conjunction with the elevator car, preferably inside a transverse beam comprised in the elevator car, thus avoiding transverse passages of hoisting ropes in the upper or lower parts of the elevator shaft, so the transverse rope tension forces are in conjunction with the car, which makes it unnecessary to provide separate supporting arrangements for the diverting pulleys and hoisting machine in the upper and/or lower parts of the elevator shaft
- by applying the invention, efficient utilization of the cross-sectional area of the shaft is achieved

- although the invention is primarily intended for use in elevators without machine room, it can also be applied for use in elevators with machine room, in which case the hoisting ropes have to be passed separately via the hoisting machine in the machine room or the traction sheave of the hoisting machine has to be arranged to be mounted in the elevator shaft
- Preferable suspension ratios above and below the elevator car are 2:1, 6:1, 10:1 and so on. Other suspension ratios may also be used, e.g. 8:1 or other even ratios. In rope suspension, if the end of the hoisting ropes is attached to the elevator car, the suspension ratio may be an odd ratio, e.g. 7:1 or 9:1.
- Symmetrical suspension of the elevator car relative to the elevator shaft or equivalent is easily achieved at least in the preferred embodiments of the invention.
- installation and maintenance of the diverting pulleys of the elevator are easy to implement as these are secured in place by means of fastening elements
- installation of the hoisting machine is easy to implement by applying the invention.

The primary area of application of the invention is elevators designed for transporting people and/or freight. A normal area of application of the invention is in elevators whose speed range is about or below 1.0 m/s but may also be higher. For example, an elevator traveling at a speed of 0.6 m/s is easy to implement according to the invention.

In the elevator of the invention, normal elevator ropes, such as generally used steel wire ropes, are applicable. The elevator may use ropes of synthetic material and rope structures with a synthetic-fiber load-bearing part, such as e.g. so-called “aramid” ropes, which have recently been proposed for use in elevators. Applicable solutions are also steel-reinforced flat belts, especially because of the small deflection radius they permit. Particularly advantageously applicable for use in the elevator of the invention are elevator hoisting ropes twisted from e.g. round and strong wires. In this way it is possible to achieve thinner ropes and, due to the smaller rope thicknesses, also smaller diverting pulleys and drive sheaves. Using round wires, the rope can be twisted in many ways using wires of the same or different thicknesses. In ropes well applicable with the invention, the wire thickness is below 0.4 mm on an average. Well-suited ropes made from strong wires are those in which the average wire thickness is under 0.3 mm or even under 0.2 mm. For example, thin-wired and strong 4-mm ropes can be twisted relatively advantageously from wires such that the average wire thickness in the finished ropes is between 0.15 . . . 0.25 mm, in which the thinnest wires may even have a thickness of only about 0.1 mm. Thin rope wires can be easily made quite strong. The invention uses rope wires of a strength exceeding about 2000 $N/mm^2$. Appropriate rope wire strengths are 2300-2700 $N/mm^2$. In principle, it is possible to use rope wires of a strength of about 3000 $N/mm^2$ or even more.

By increasing the contact angle using a rope pulley functioning as a diverting pulley, the grip between the traction sheave and the hoisting ropes can be improved. A contact angle of over 180° between the traction sheave and the hoisting rope is achieved by using a diverting pulley or diverting pulleys. In this way, a lighter car of a reduced weight can be used, thus increasing the space-saving potential of the elevator.

The elevator of the invention is an elevator without counterweight and with an elevator car guided by guide rails and suspended by means of diverting pulleys on a set of hoisting ropes in such manner that that the set of hoisting ropes of the elevator comprises rope portions going upwards and downwards from the elevator car. The elevator comprises a number of diverting pulleys in the upper and lower parts of the elevator shaft. The elevator has a drive machine provided with a traction sheave and placed in the elevator shaft. The elevator comprises a compensating device acting on the hoisting ropes to equalize and/or compensate the rope tension and/or rope elongation. The elevator car has diverting pulleys mounted on it near the two side walls. In the elevator of the invention, the rope portions going from the diverting pulleys in the lower part of the elevator shaft and from the diverting pulleys in the upper part of the elevator shaft to the diverting pulleys mounted on the elevator car extend substantially vertically. In the elevator, the rope portions connecting the rope portions extending from one side of the elevator car to the other side are rope portions between diverting pulleys mounted near different side walls of the elevator car.

Figure 8:
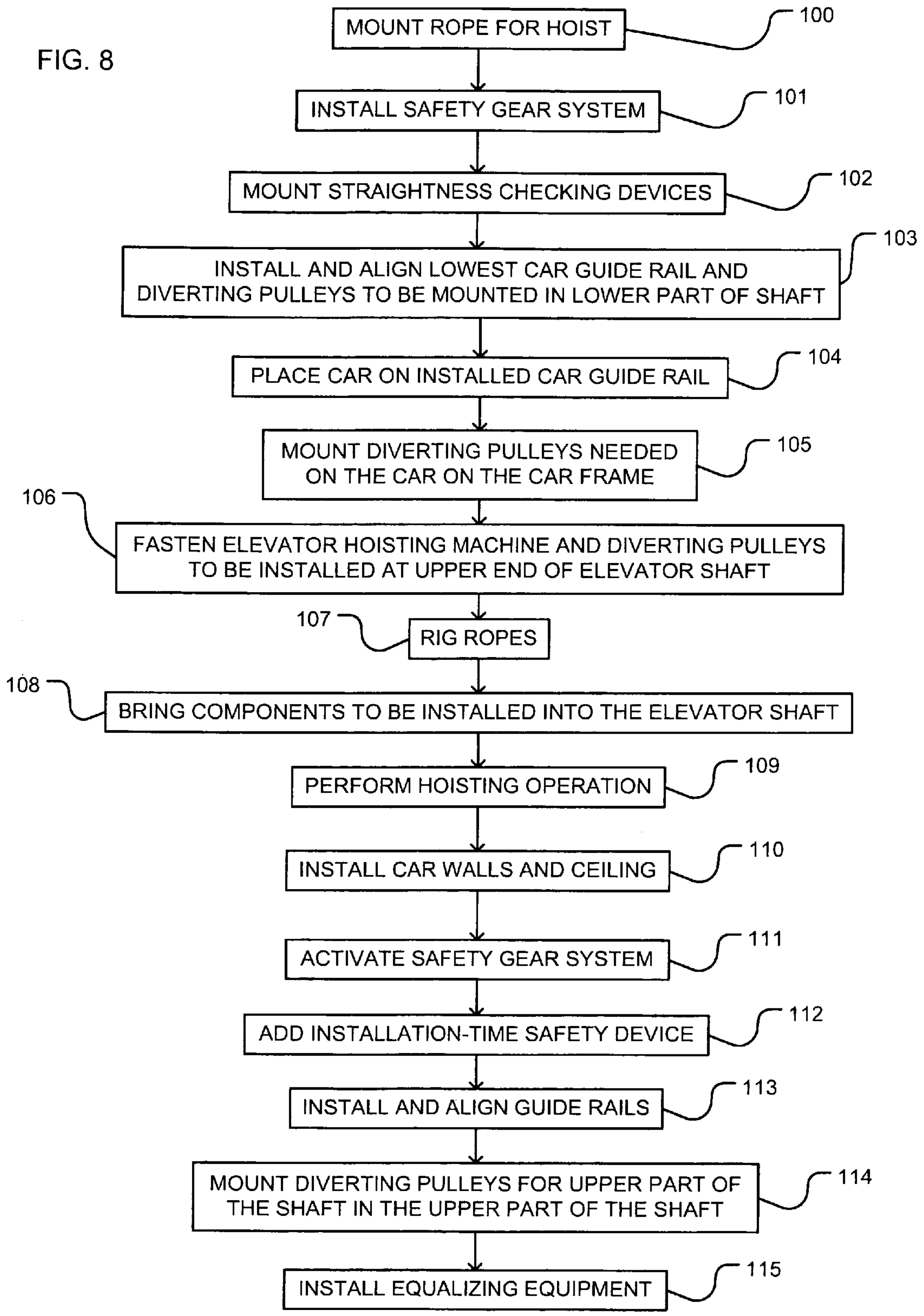

According to the invention, the elevator installation or the installation of the elevator of the invention may proceed as follows:

1. Referring to FIG. 8, at 100 a rope for a hoist is mounted in the elevator shaft e.g. by fastening to the ceiling a pulley block to which the rope is passed, and a hoisting device suited for the installation work is introduced to drive the rope.
2. At 101, an overspeed governor—safety gear system is installed in the shaft so that the elevator car to be installed or a part of it that is going to be used in the installation work can be protected against uncontrolled movement already during the installation work.
3. At 102, plumb lines, laser sources, preferably two, or similar devices to be used for checking the straightness of the shaft and in the installation and alignment of the car guide rails are mounted in the shaft.
4. At 103, the lowest car guide rail sections are installed and aligned in position. The diverting pulleys to be mounted in the lower part of the shaft, e.g. at the lower ends of the guide rails, and possible diverting pulleys to be mounted under the elevator car are preferably installed in conjunction with the installation of the first guide rail sections.
5. At 104, on the first installed guide rail sections are placed the car on buffers and a frame supporting the car (also functioning as a safety gear frame) or, in the case of a self-supporting car, at least a beam or beams to which the diverting pulleys placed on the car are to be mounted. Preferably, a solution is used wherein the car frame or other car-supporting structure is clearly lower than it will be in the finished elevator. For example, the car frame may be a telescopic structure. During installation, the mutual positions of the car and guide rails are controlled by means of conventional sliding or roller guides mounted on the car/car frame.
6. At 105, diverting pulleys needed on the car are mounted on the car frame or other car part installed on the guide rails and, using temporary support blocks or by other means. At 106, the diverting pulleys to be installed at the upper end of the elevator shaft, and preferably the elevator hoisting machine as well, are also fastened to the said car frame or other part. All the diverting pulleys of the elevator are now close to the lower part of the elevator shaft, being accessible for rigging from the shaft bottom or other working platform or without requiring the installer to ascend or descend more than a couple of steps between working platforms at different heights.
7. At 107, the rigging of the ropes is carried out by pulling the ropes from one diverting pulley to another. The rope reels are preferably placed on the bottom of the elevator shaft in a frame supporting the reels, from which the rope is then passed to the diverting pulleys in accordance with a roping diagram.
8. At 108, components to be installed or preferably all the components to be installed are brought into the elevator shaft and arrangements are made to allow them to be taken along on the elevator car or a car frame provided with a suitable working platform when the latter is beginning to be raised or has been raised to a higher level in the elevator shaft.
9. At 109, using the hoist, a hoisting operation is performed by hoisting the upper part of the car frame or the beam structure in the upper part of the car so that the preferably telescopically constructed car frame is stretched/the top beam of the car comes to a sufficient height, preferably to a height that, in respect of the construction of the car, corresponds to the final car height from the structure of the lower part of the car/car frame to allow the car to be constructed. The beam of the upper part of the car frame/car is firmly secured to the lower part of the car frame/car using a fastening arrangement either final or temporary in respect of installation of the elevator. In the case of a car frame, it is preferable to lock the telescoping car frame to its final height at this stage, whereas in the case of a self-supporting car, the top beam of the car and a working surface in the lower part of the car, e.g., the car floor, can be fastened together by the car walls or by other means, e.g., with temporary beams or tension bars. The car floor is preferably installed at this stage, both in the case of a car with a car frame and in the case of a self-supporting car construction. To the structure thus obtained are fastened boxes or holders on which the car guide rails are carried along. In an installation with a car frame, conventional rubber insulators or other suitable vibration-insulating elements are placed between the car floor and the car frame.
10. At 110, the car walls are installed, preferably starting from the back wall. The walls and the floor preferably constitute in themselves a structure relatively rigid against torsion, but if necessary the structure can be stiffened by means of separate reinforcing elements.
11. Also at 110, the ceiling of the car is mounted in place, preferably by a final arrangement, thus making the car itself quite stiff, so it will be well able to withstand all the stress it is subjected to during installation and subsequent operation.
12. At 111, the overspeed governor—safety gear system is activated in its function of controlling the motion of the car.
13. At 112, an installation-time safety device acting on the safety gear or other means locking the elevator car to the guide rails is added to the elevator. The installation-time safety device may be automatic, such that whenever the rope of the hoist used to lift the elevator car becomes loose or the force supporting the elevator car falls below a certain limit, the safety device causes the car to be immovably locked to the guide rail. The safety device may be a pedal or other coupling means that is used by the installer to keep the safety gear or other safety device in a state permitting movement of the elevator as he/she is driving the elevator by means of the hoist, and at other times the safety device automatically prevents movement of the elevator car.
14. At 113, in a preferable case, all the guide rails are loaded onto the car and the installation of the car guide rails is started by installing new guide rails above those already installed, using the elevator car as a working platform and raising the elevator car upwards by means of the hoist as the installation work is progressing.

15. Also at 113, the guide rails are aligned with the help of laser beams and/or other means conventionally used for the alignment of guide rails.
16. At 114, when the upper end of the shaft is reached, the diverting pulleys brought on the car for the upper part of the shaft are mounted in the upper part of the shaft, preferably on diverting pulley supporters secured to the upper part of the elevator guide rails. The drive machine of the elevator is also preferably mounted on a guide rail. The drive machine and at least one of the diverting pulleys may have a common supporter by which they are supported on the guide rail. If necessary, a suitable hoist or other hoisting tool is utilized. In the case of an elevator with machine below, the hoisting machine is mounted in place in a corresponding manner. All the time during the hoisting of the elevator car and installation of the diverting pulleys and hoisting machine, the hoisting ropes have been delivered from their reels as required by the distances between the rope wheels increasing with the progress of the installation. At the beginning of the installation work, one end of the ropes may already have been secured in place.
17. At 115, the equipment equalizing rope forces and compensating rope elongations is installed for operation and the ends of the ropes are secured to the positions determined by the roping diagram. The elevator car is now practically on its guide rails.

The installation work will not necessarily follow the above-described procedure in all the various stages of installation and/or not all the stages of installation are necessary, at least quite in the form described above. For example, the installation can be implemented by first building a car supporting frame either completely or partly and then securing a working platform to the frame and mounting the guide rails from bottom to top, whereupon the ropes are rigged on the rope wheels of the elevator and the car is built and finally the diverting pulleys for the upper part of the elevator shaft and the machine are moved to the upper part of the elevator shaft and mounted in place. Even the procedure according to this example could be varied by building the car in the last step of the procedure. Correspondingly, when a new elevator is installed in place of an old one but the old guide rails are used, the installation of guide rails would be left out completely from the steps of the method.

In simplified terms it could be stated that, in installing an elevator without counterweight, the main components of the elevator are at first installed on the bottom of the shaft between the first guide rails, the two first guide rail sections being typically of a length of a few meters, preferably equal to about one floor-to-floor height or distance. Often the guide rails are delivered in sections of a length of about five meters; which are then joined together during installation to form a guide rail line extending from the lower part of the elevator shaft to its upper part. In less spacious environments shorter guide rail sections of a length of about 2½ meters are easier to handle. Between the first guide rails is assembled a car supporting frame, a safety gear frame, an elevator car or equivalent, which is used as an “installation tool” and/or as an installation carriage, to which are secured in a temporary manner the diverting pulleys of the car as well as the hoisting machine together with the associated equipment. The diverting pulleys for the lower part of the shaft are mounted in the lower part of the shaft. The roping is installed on the diverting pulleys and on the traction sheave of the machine and a possible double wrap wheel while the car supporting frame and the pulleys for the upper part of the shaft that have been temporarily secured to it are still in the lower part of the shaft. Once the ropes are in place on the rope wheels, it is “stretched” to its final length by moving the car supporting frame/car upwards according to the progress of the guide rail installing work utilizing the car supporting frame/car and by finally raising the diverting pulley for the upper part of the shaft and the machine to their final positions.

During the rigging work, the diverting pulleys and machines supported on the car are preferably near the shaft bottom, e.g. so that the installer can carry out the rigging work from the bottom of the shaft and from a foot stool possibly provided on the bottom of the shaft or from some other working platform placed near the bottom of the shaft. The car or the car supporting frame is provided with means, such as a mounting or other fastening point, or a possibility to secure a carrying pallet or support for carrying the diverting pulleys to the upper part of the shaft. By implementing the car supporting frame as a telescopic structure, e.g. such that its lateral upright beams are each made of two parts of which one goes inside the other. Such a structure can be extended almost to a double height, and thus the upper part of a car supporting frame having a final height of over two meters and the diverting pulleys secured to the upper part can be reached by the installer from the bottom of the shaft when the supporting frame is in the collapsed form. After the diverting pulleys have been fastened to the supporting frame and the roping has been mounted on the diverting pulleys, the supporting frame can be stretched to its final height.

Figure 2:
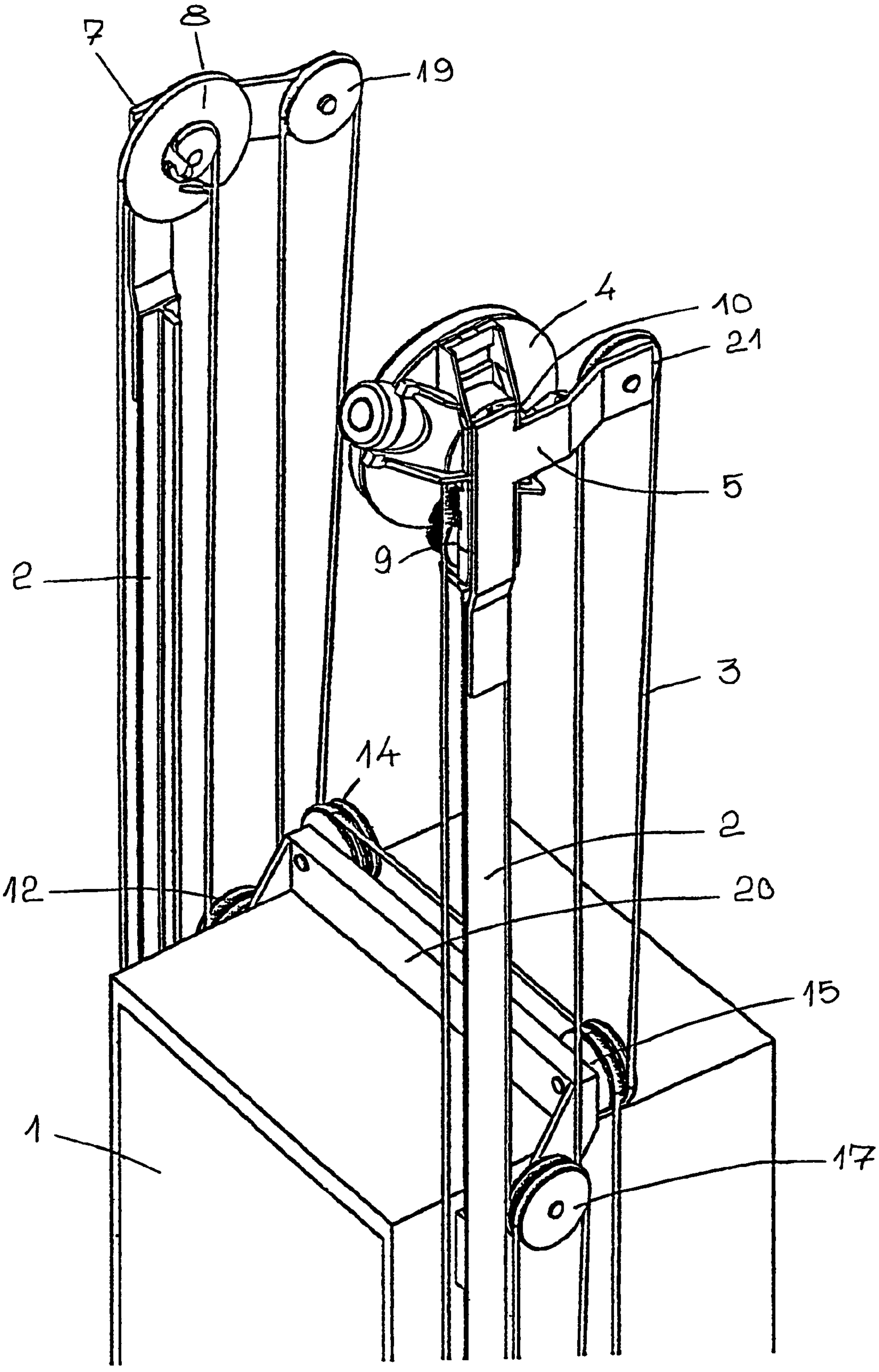
Figure 3:
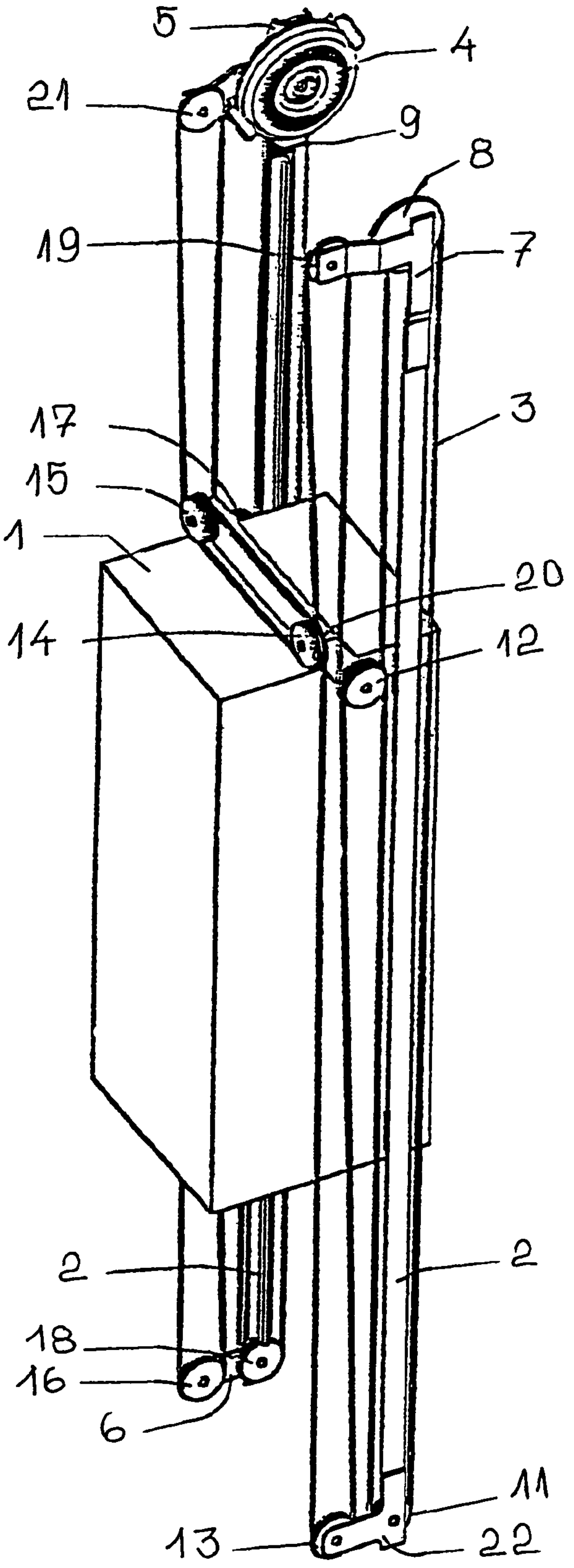
Figure 4:
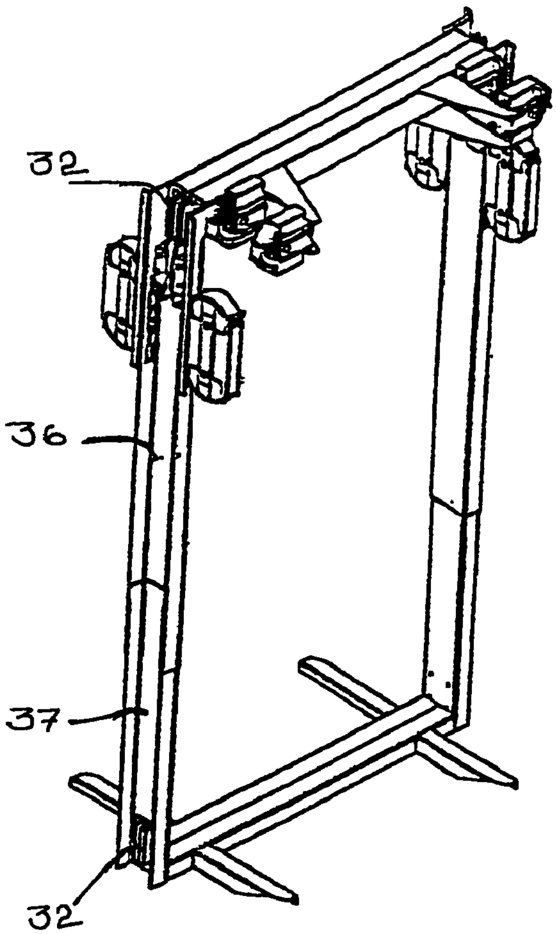
Figure 5:
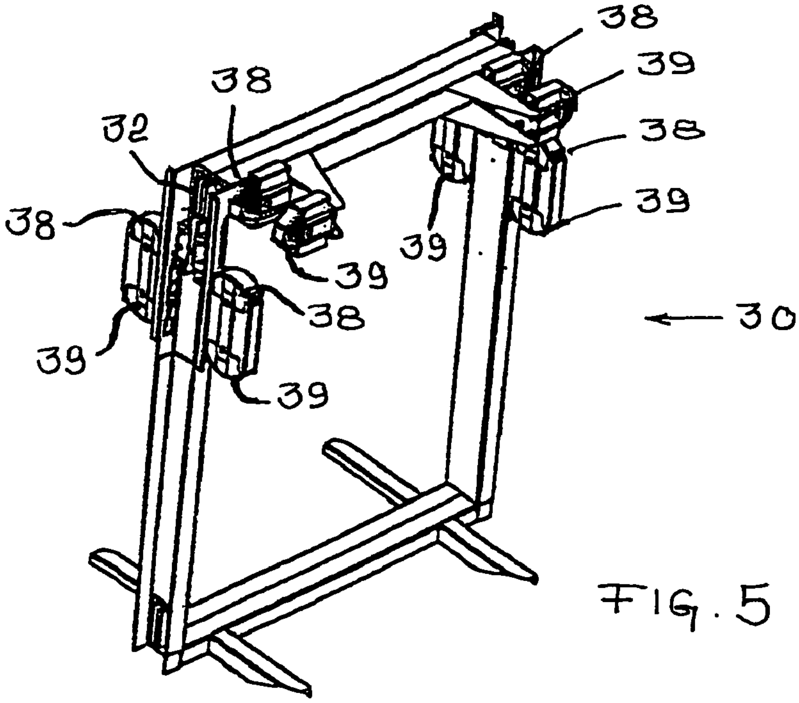
Figure 6:
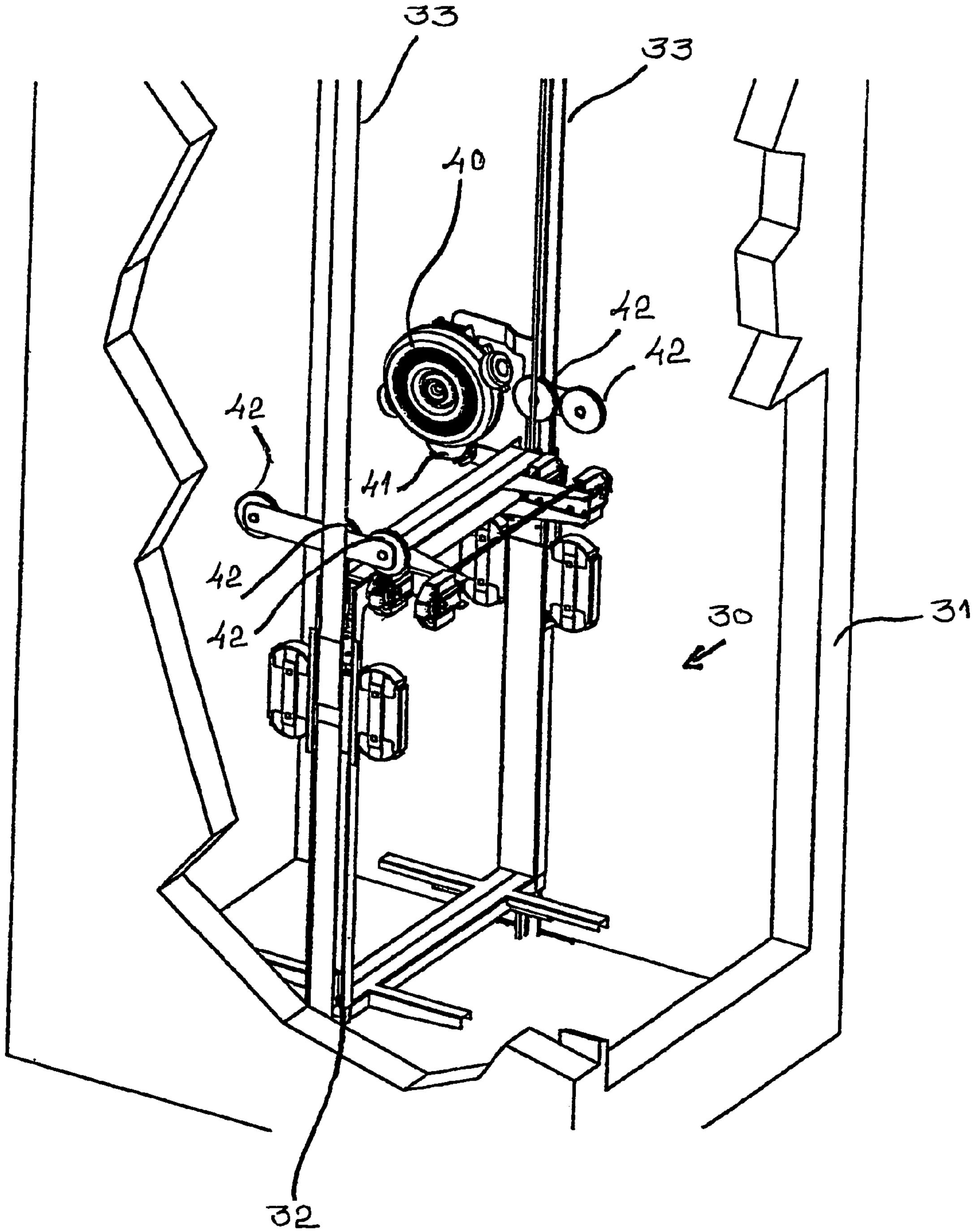
Figure 7:
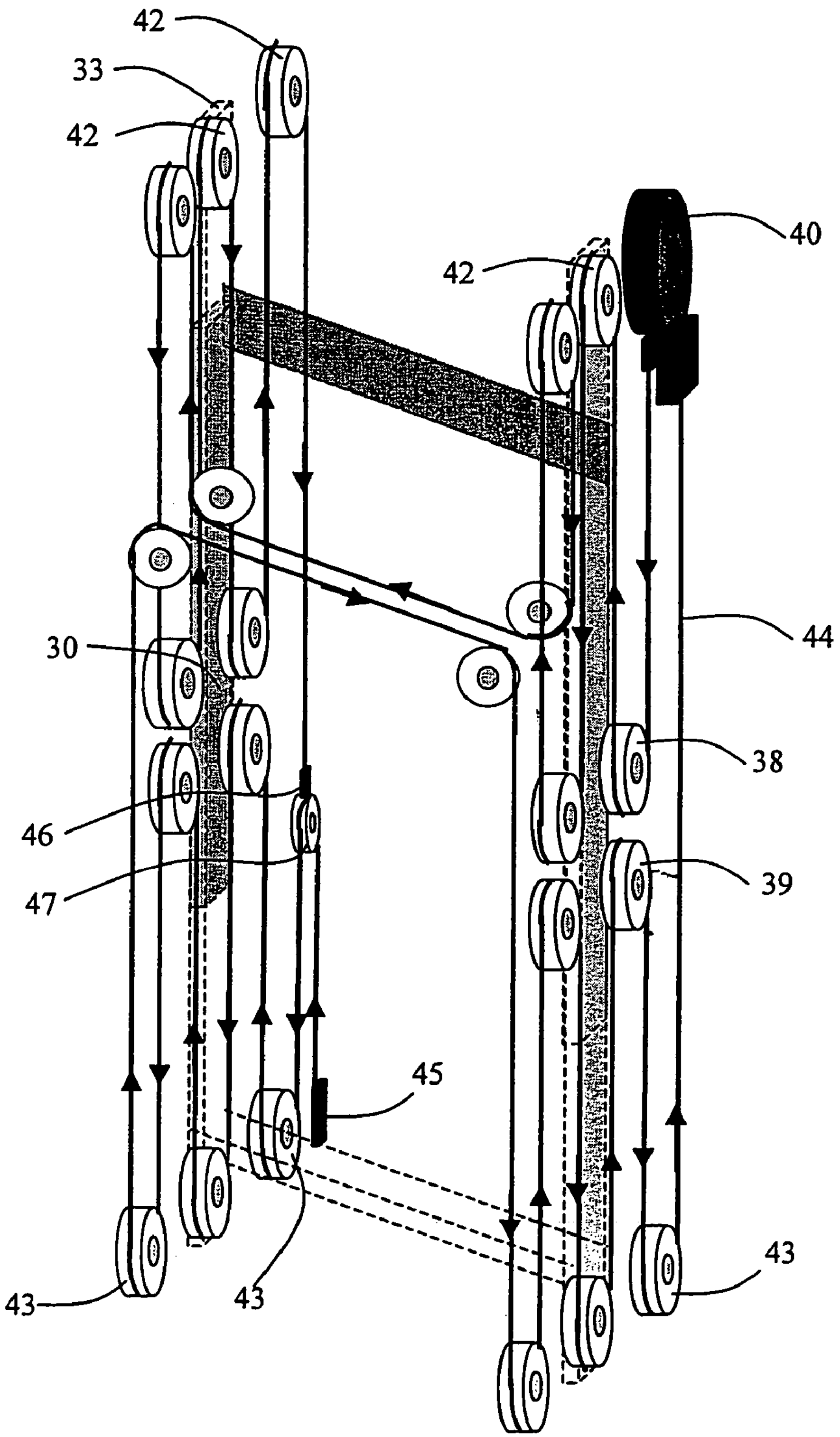

In the following, the invention will be described in detail with reference to a few embodiment examples and the attached drawings, wherein FIG. 1 is a diagram representing an elevator according to the invention, FIG. 2 is a diagram representing an elevator according to the invention and FIG. 1 as seen from another angle, FIG. 3 is a diagram representing an elevator according to the invention and FIGS. 1 and 2 as seen from a third angle, FIG. 4 presents a car supporting frame according to the invention, extended to a height at which the car can be installed in the frame, FIG. 5 presents the car supporting frame of the invention in a collapsed form, FIG. 6 presents the car supporting frame of the invention on the bottom of the shaft, and FIG. 7 is a diagrammatic representation of rope rigging implemented according to the invention.

FIG. 8 is a flow chart illustrating a method according to an example embodiment.

FIGS. 1, 2, and 3 illustrate the structure of an elevator according to the invention. The elevator is preferably an elevator without machine room and with a drive machine 4 placed in the elevator shaft. The elevator presented in the figures is a traction sheave elevator without counterweight and with machine above, in which the elevator car 1 moves along guide rails 2. In FIGS. 1, 2, and 3, the hoisting ropes run as follows. One end of the hoisting ropes is fixed to a wheel of a smaller diameter comprised in a compensating gear functioning as a compensating device 8, said wheel being fixedly attached to a second wheel of a larger diameter comprised in the compensating gear 8. This compensating gear 8 functioning as a compensating device has been fitted to be fastened to the elevator shaft via a supporting element 7 immovably fixed to an elevator guide rail 2. From the compensating gear 8 wheel of smaller diameter, the hoisting ropes 3 go downwards to a diverting pulley 12 mounted on the elevator car 1, preferably on a beam 20 fitted in place in the upper part of the elevator car 1, and pass around the diverting pulley 12 along rope grooves provided on it. In the rope wheels used as diverting pulleys, these rope grooves may be coated or uncoated, e.g., with a friction-increasing material, such as polyurethane or some other appropriate material. From diverting pulley 12, the hoisting ropes 3 go further upwards to a diverting pulley 19 in the elevator shaft, said pulley being mounted in place on the supporting element 7, via which the diverting pulley 19 is mounted in place on the elevator guide rail 2. Having passed around diverting pulley 19, the hoisting ropes 3 go further downwards to a diverting pulley 14 which has also been fitted in place on a beam 20 fitted in place on the elevator car 1, preferably in the upper part of the elevator car 1. Having passed around diverting pulley 14, the hoisting ropes 3 go further transversely relative to the elevator shaft and elevator car 1 to a diverting pulley 15 mounted in place on the same beam 20 on the other side of the elevator car 1 and, after passing around this diverting pulley 15, the hoisting ropes 3 go further upwards to a diverting pulley 21 mounted in place in the upper part of the elevator shaft. Diverting pulley 21 has been fitted in place on a supporting element 5. Via the supporting element 5, the diverting pulley 21 is supported by the elevator guide rails 2. Having passed around diverting pulley 21, the hoisting ropes 3 go further downwards to a diverting pulley 17 mounted on the elevator car 1 and also fitted in place on the beam 20. Having passed around diverting pulley 17, the hoisting ropes 3 go further upwards to a diverting pulley 9 preferably mounted in place near the hoisting machine 4. Between diverting pulley 9 and the traction sheave 10, FIGS. 1, 2, and 3 show Double Wrap ("DW") roping. From diverting pulley 9, the hoisting ropes 3 go further to the traction sheave 10 after first passing via diverting pulley 9 in "tangential contact" with it. This means that the hoisting ropes 3 going from the traction sheave 10 to the elevator car 1 pass via the rope grooves of diverting pulley 9 and the deflection of the hoisting ropes 3 caused by the diverting pulley 9 is very small. It could be stated that the hoisting ropes 3 going from the traction sheave 10 only come into "tangential contact" with the diverting pulley 9. Such "tangential contact" functions as a solution for damping rope vibrations and it can also be applied in other roping solutions. The hoisting ropes 3 pass over the traction sheave 10 of the hoisting machine 4 along the rope grooves on the traction sheave 10. From the traction sheave 10, the hoisting ropes 3 go further downwards to diverting pulley 9, passing around it along the rope grooves of the diverting pulley 9 and returning back up to the traction sheave 10, over which the hoisting ropes 3 pass along the rope grooves of the traction sheave 10. From the traction sheave 10, the hoisting ropes 3 go further downwards in "tangential contact" with diverting pulley 9 past the elevator car 1 moving along the elevator guide rails 2 to a diverting pulley 18 placed in the lower part of the elevator shaft. The hoisting machine 4 and diverting pulley 9 are mounted in place on the supporting element 5, which in turn is fixed in place on the elevator guide rails 2. Diverting pulleys 12, 19, 14, 15, 21, 17, 9 and the wheel of smaller diameter comprised in the compensating gear 8, together with the traction sheave 10 of the hoisting machine 4, form the suspension above the elevator car 1 with the same suspension ratio as below the elevator car 1, this suspension ratio in FIGS. 1, 2, and 3 being 6:1. The hoisting ropes 3 pass around diverting pulley 18 along rope grooves provided on it, which has been fitted in place preferably in the lower part of the elevator shaft on a supporting element 6 fixed in place to an elevator guide rail 2. Having passed around diverting pulley 18, the hoisting ropes 3 go further upwards to diverting pulley 17 fitted in place on the elevator car 1 and mounted on the beam 20 and, having passed around said diverting pulley 17, the hoisting ropes 3 go further downwards to a diverting pulley 16 in the lower part of the elevator shaft, which has been fitted in place on supporting element 6. Having passed around diverting pulley 16, the hoisting ropes 3 return to diverting pulley 15 fitted in place on the elevator car 1, said diverting pulley 15 being mounted on the beam 20. From diverting pulley 15, the hoisting ropes 3 go further transversely across the elevator car 1 to the diverting pulley 14 mounted in place on the beam 20 on the other side of the elevator car 1. Having passed around this diverting pulley 14, the hoisting ropes 3 go further downwards to a diverting pulley 13 fitted in place in the lower part of the elevator shaft, said diverting pulley 13 being mounted in place on a supporting element 22, which supporting element 22 in turn has been fixed in place to the elevator guide rail 2. Having passed around diverting pulley 13, the hoisting ropes 3 go further upwards to diverting pulley 12 fitted in place on the elevator car 1, said diverting pulley 12 being mounted on the beam 20. Having passed around diverting pulley 12, the hoisting ropes 3 go further downwards to a diverting pulley 11 mounted in place on a supporting element 22 in the lower part of the elevator shaft. Having passed around diverting pulley 11, the hoisting ropes 3 go further upwards to the compensating gear 8 mounted in place in the upper part of the shaft, the second end of the hoisting ropes 3 being fixed to the compensating gear 8 wheel of larger diameter. The compensating gear functioning as a compensating device 8, is mounted in place on supporting element 7. Diverting pulleys 18, 17, 16, 15, 14, 13, 12, 11 and the wheel of larger diameter in the compensating gear 8, functioning as a compensating device 8 form the suspension below the elevator car 1 with the same suspension ratio as in the suspension above the elevator car 1, this suspension ratio being 6:1 in FIGS. 1, 2, and 3.

As may be seen in FIGS. 1, 2, and 3, the portion of hoisting ropes 3 between diverting pulley 12 and diverting pulley 19 may not be directly above elevator car 1. As may be seen in FIGS. 1, 2, and 3, the portion of hoisting ropes 3 between diverting pulley 17 and diverting pulley 9 may not be directly above elevator car 1. As may be seen in FIGS. 1, 2, and 3, the portion of hoisting ropes 3 between diverting pulley 17 and diverting pulley 21 may not be directly above elevator car 1.

In FIGS. 1, 2, and 3, the compensating gear 8 consists of two wheel-like bodies, preferably wheels, of different diameters and immovably fixed to each other, which compensating gear 8 has been fitted in place on the supporting element 7, which again is mounted in place on the elevator guide rails 2. Of the wheel-like bodies comprised in the compensating gear 8, the wheel connected to the hoisting ropes 3 below the elevator car 1 has a larger diameter than the wheel connected to the hoisting ropes 3 above the elevator car 1. The diameter ratio between the diameters of the wheels of the compensating gear defines the tensioning forces acting on the hoisting ropes 3 and therefore also the force of compensation of the elongations of the hoisting ropes 3 and at the same time the magnitude of the rope elongation to be compensated. The use of a compensating gear 8 provides the advantage that this structure will compensate even very large rope elongations. By varying the size of the diameters of the wheels of the compensating gear 8, it is possible to exert an influence on the magnitude of the rope elongation to be compensated and on the ratio between the rope forces $T_1$ and $T_2$ acting over the traction sheave, which ratio can be standardized by the arrangement in question. Due to a large suspension ratio or a large hoisting height, the length of the hoisting ropes 3 used in the elevator is large. Therefore, it is essential for the operation and safety of the elevator that the hoisting rope portion below the elevator car 1 is held under a sufficient tension and that the amount of rope elongation to be compensated is large. Often this can not be implemented using a spring or a simple lever. With odd suspension ratios above and below the elevator car 1, the compensating gear functioning as a compensating device in the elevator depicted in FIGS. 1, 2, and 3 has been fitted in place on the elevator car 1 by means of a transfer gear, and with even suspension ratios the compensating gear functioning as a compensating device in the elevator of the invention has been fitted in place in the elevator shaft, preferably on the elevator guide rails 2. In the compensating gear 8 of the invention, it is possible to use wheels, the number of which is two, but the number of wheel-like bodies used may vary, for example it is possible to use only one wheel with hoisting rope fixing points fitted on it at different positions with respect to the diameter. It is also possible to use more than two wheels if it is desirable, e.g., to vary the ratio between the diameters of the wheels by only changing the diameters of the wheels in the compensating gear. The elevator without counterweight presented in FIGS. 1, 2, and 3 is not provided with traditional springs for compensating the rope forces, but instead it uses a compensating gear 8 as a compensating device. Consequently, the ropes comprised in the set of hoisting ropes 3 can be secured directly to the compensating gear 8. Besides a compensating gear 8 as presented in the figures, the compensating device 8 of the invention may also consist of a suitable lever or other appropriate compensating device with several compensating wheels. The beam 20 presented in the figures, which is fixed in place in conjunction with the elevator car 1 may also be mounted elsewhere than in the place above the elevator car 1 as shown in the figures. It may also be placed, e.g., below the elevator car 1 or somewhere between these positions. The diverting pulleys may have a plurality of grooves and the same diverting pulley can be used to guide both the passage of the hoisting ropes 3 comprised in the suspension above the elevator car 1 and the passage of the hoisting ropes 3 comprised in the suspension below the elevator car 1, as illustrated, e.g., in the figures in connection with diverting pulleys 12, 14, 15, 17.

A preferred embodiment of the elevator of the invention is an elevator without counterweight and with machine above, which elevator has a drive machine with a coated traction sheave and thin hoisting ropes of a substantially round cross-section. The contact angle of the hoisting ropes on the traction sheave of the elevator is greater than 180°. The elevator comprises a unit comprising the drive machine, the traction sheave and a diverting pulley, all fitted in place via a supporting element, the diverting pulley being ready fitted in a correct angle relative to the traction sheave. This unit is secured to the elevator guide rails. The elevator is implemented without counterweight with a suspension ratio of 6:1. The compensation of rope forces and elongations is implemented using a compensating device according to the invention. The diverting pulleys in the elevator shaft are fitted in place by means of supporting elements on the elevator guide rails and the diverting pulleys on the elevator car are all mounted in place on a beam on the elevator car, said beam also forming a structure bracing the elevator car.

The elevator car 1 is suspended on the hoisting ropes via the beam 20 and the diverting pulleys mounted on the beam. The beam 20 is part of the load-bearing structure of the elevator car, which may be in the form of a self-supporting car or a framework of beams or the like joined or integrated to the elevator car. The elevator is preferably installed by first rigging the ropes and only then completing the elevator car. The floor 24 of the elevator car 1 can be initially placed as a working platform or a separate working platform can be used for the rigging work. For the time of installation of the elevator ropes on the rope wheels, the diverting pulleys of the elevator car and the pulleys for the lower part of the elevator shaft and possibly also the pulleys for the upper part of the elevator shaft are placed close to each other so that the installer can reach them from the working platform or from the bottom of the shaft. The working platform is close to the shaft bottom during the installation of the ropes on the rope wheels. Once the hoisting ropes have been mounted on the diverting pulleys, the diverting pulleys in the upper and lower parts of the elevator shaft and those on the elevator car can be moved further away from each other while at the same time supplying more rope into the elongating roping. The diverting pulleys in the upper part of the elevator shaft are mounted in place by utilizing the elevator car or in some other way. The diverting pulleys of the elevator car are raised together with the beam 20 to a distance from the floor 24 of the elevator car and the elevator car 1 is assembled by joining the walls 25 to the floor and mounting the beam 20 and ceiling 23 in the upper part of the elevator car.

FIG. 7 illustrates how the ropes of an elevator implemented according to the invention are passed over different diverting pulleys and rope pulleys of the hoisting machine, and FIGS. 4, 5, and 6 show the car supporting frame 30, which in FIG. 4 is presented in a length in which the elevator car 1 can be installed inside the frame while FIG. 5 presents it in a collapsed or lower form that makes the frame easy to transport, as far as the frame is transported as a complete assembly, with diverting pulleys mounted on it, allowing the ropes to be easily passed to them when the car supporting frame 30 is on the bottom of the elevator shaft 31, as illustrated in FIG. 6. The car supporting frame 30 is provided with guides 32, by means of which the elevator car 1 is positioned and guided as it is moving vertically along the elevator guide rails 33. The upper part 34 and lower part 35 of the car supporting frame 30 are telescopically joined together by beam sections 36 and 37 of the side beams of the car supporting frame 30, which sections go inside each other. The telescopic or otherwise variable-length joining together of the upper and lower parts can also be implemented in other ways. The car supporting frame 30 is provided with diverting pulleys intended for the suspension of the elevator car 1 on the hoisting ropes 3, comprising a first set of diverting pulleys 38, from which the ropes of the set of hoisting ropes 3 go upwards, and a second set of diverting pulleys 39, from which the ropes of the set of hoisting ropes 3 go downwards. FIG. 6 shows the diverting pulleys 42 to be installed in the upper part of the shaft, but which are temporarily mounted on the car supporting frame 30, the hoisting machine 40 with a traction sheave (not shown) and preferably an auxiliary diverting pulley 41, which allows the roping on the machine to be implemented as so-called Double Wrap roping or the contact angle between the traction sheave and the hoisting ropes 3 to be changed in other ways. In FIG. 7, the set of hoisting ropes 44 is depicted as a single rope with arrowheads indicating the passage of the rope, starting from the rope end fixing point 45 in the lower part of the shaft and finally ending up at a rope force differentiating arrangement 46, which consists of a tackle system designed to maintain the relative rope tension difference between the rope portions above and below the elevator car 1. The rope force differentiating arrangement 46 can also be implemented in other ways, which may involve a different solution regarding the fixing of the rope ends. Starting from the fixing point 45, the ropes go first to a rope wheel 47 comprised in the differentiating arrangement 46, then continuing first to the diverting pulley 43 in the lower part of the shaft, from where the rope goes further to a down-direction diverting pulley 39 of the elevator car 1 and further, passing one by one over the diverting pulleys in the lower part of the shaft and the down-direction diverting pulleys of the elevator car 1, until from the last diverting pulley in the lower part of the shaft the ropes go up to the machine 40. From the machine 40, the ropes run further to the first up-direction diverting pulley 38 on the elevator car 1, passing by turns over the diverting pulleys 42 in the upper part of the shaft and each up-direction diverting pulley 38 until from the last diverting pulley in the upper part of the shaft, the ropes terminate at the rope force differentiating arrangement 46.

It is obvious to the person skilled in the art that different embodiments of the invention are not limited to the examples described above, but that they may be varied within the scope of the claims presented below. For example, the number of times the hoisting ropes are passed between the diverting pulleys in the upper part of the elevator shaft and those on the elevator car and between the diverting pulleys in the lower part of the elevator shaft and those on the elevator car is not a very decisive question as regards the basic advantages of the invention, although it is possible to achieve some additional advantages by using multiple and even numbers of rope portions. It is also obvious to the skilled person that an embodiment according to the invention can also be implemented using odd suspension ratios above and below the elevator car, in which case the compensating device is mounted in conjunction with the elevator car or its structures. In accordance with the examples described above, a skilled person can vary the embodiment of the invention as the traction sheaves and rope pulleys, instead of being coated metal pulleys, may also be uncoated metal pulleys or uncoated pulleys made of some other material suited to the purpose.

It is further obvious to the person skilled in the art that the metallic traction sheaves and rope wheels used as diverting pulleys in the invention, which are coated with a non-metallic material at least in the area of their grooves, may be implemented using a coating material consisting of e.g. rubber, polyurethane or some other material suited to the purpose.

It is also obvious to the person skilled in the art that the elevator car and the machine unit may be laid out in the cross-section of the elevator shaft in a manner differing from the lay-out described in the examples. The skilled person also understands that 'elevator car' may refer to a self-supporting car structure, an assembly consisting of an elevator car and a car supporting frame, or also a car structure mounted inside a car supporting frame.

It is obvious to the skilled person that an elevator applying the invention may be equipped differently from the examples described above. It is further obvious to the skilled person that the elevator of the invention can be implemented using as hoisting ropes almost any flexible hoisting means, e.g. a flexible rope of one or more strands, a flat belt, a cogged belt, a trapezoidal belt or some other type of belt suited to the purpose.

It is further obvious to the skilled person that the elevator of the invention may also be provided with a counterweight, in which case the counterweight of the elevator preferably has a weight below that of the car and is suspended by a separate set of ropes. The skilled person understands that an elevator shaft is not strictly necessary for the elevator, provided that sufficient safety and protection of the technical parts are achieved.

The invention claimed is:

1. A method for installing an elevator, the elevator to be installed including car guide rails, an elevator car, a hoisting rope or two or more parallel hoisting ropes, a traction sheave configured to be disposed in a first location that is fixed relative to an elevator shaft of the elevator, a compensating system configured to be disposed in a second location that is fixed relative to the elevator shaft, a plurality of first diverting pulleys in an upper part of the elevator shaft, a plurality of second diverting pulleys in a lower part of the elevator shaft, a plurality of third diverting pulleys on the elevator car, and a plurality of fourth diverting pulleys on the elevator car, the method comprising:

rigging at least some of the first diverting pulleys in the lower part of the elevator shaft;

rigging at least some of the third diverting pulleys on the elevator car;

raising the at least some of the first diverting pulleys in the rigged state to the upper part of the elevator shaft; and mounting in place the at least some of the first diverting pulleys;

wherein, when installed, the traction sheave moves the elevator car using the hoisting rope or two or more parallel hoisting ropes, wherein, when installed, the hoisting rope has first rope portions going upward from the third diverting pulleys to the first diverting pulleys or the two or more parallel hoisting ropes have first rope portions going upward from the third diverting pulleys to the first diverting pulleys, wherein, when installed, the hoisting rope has second rope portions going downward from the fourth diverting pulleys to the second diverting pulleys or the two or more parallel hoisting ropes have second rope portions going downward from the fourth diverting pulleys to the second diverting pulleys, wherein, when installed, the compensating system causes a first rope tension in the first rope portions, wherein, when installed, the compensating system causes a second rope tension in the second rope portions, wherein, when installed, the compensating system compensates rope elongations in the first and second rope portions so as to maintain a ratio of the first rope tension to the second rope tension substantially constant, and wherein, when installed, the plurality of first diverting pulleys are mounted directly to the car guide rails or each of the plurality of first diverting pulleys are mounted to the car guide rails via a separate supporting element.

2. The method of claim 1, wherein the method is carried out using the elevator car or a car supporting frame that is, at first, a low structure in the elevator shaft that then can be elevated to a final height, wherein the third diverting pulleys are secured to the elevator car or the car supporting frame, wherein the first diverting pulleys are temporarily fastened to the elevator car or the car supporting frame, and wherein after the third diverting pulleys secured to the elevator car or the car supporting frame are rigged and the first diverting pulleys temporarily fastened to the elevator car or the car supporting frame are rigged, the elevator car is brought to the final height or the car supporting frame is brought to the final height and the elevator car is mounted in the car supporting frame.

3. The method of claim 2, the elevator further including:

a drive machine operatively connected to the traction sheave;

wherein the drive machine is temporarily fastened to the elevator car or the car supporting frame.

4. An elevator installed according to claim 1.

5. The elevator of claim 4, wherein the elevator has a telescopic car supporting frame.

6. The elevator of claim 4, wherein the elevator is an elevator without machine room.

7. The elevator of claim 4, wherein the elevator is an elevator without counterweight.

8. The method of claim 1, wherein all of the first diverting pulleys are rigged in the lower part of the elevator shaft.

9. The method of claim 8, wherein all of the first diverting pulleys are raised in the rigged state to the upper part of the elevator shaft.

10. The method of claim 9, wherein all of the second diverting pulleys are rigged before all of the first diverting pulleys are raised in the rigged state to the upper part of the elevator shaft.

11. The method of claim 1, wherein the first diverting pulleys are raised using the elevator car or a part of the elevator car provided with a mounting platform.

12. The method of claim 1, the elevator further including:
a drive machine operatively connected to the traction sheave;
wherein the traction sheave is rigged and the drive machine is raised to the upper part of the elevator shaft, together with the first diverting pulleys, and mounted in place.

13. The method of claim 1, wherein at least some of the second diverting pulleys are rigged before raising the at least some of the first diverting pulleys in the rigged state to the upper part of the elevator shaft.

14. The method of claim 1, wherein while the first diverting pulleys are being raised, the car guide rails are installed in the elevator shaft at a same time using the elevator car, a structure comprised in the elevator car, or a working platform supported by a structure comprised in the elevator car.

15. The method of claim 1, wherein the elevator is an elevator without machine room.

16. The method of claim 1, wherein the elevator is an elevator without counterweight.

17. The method of claim 1, wherein all of the second diverting pulleys are rigged before raising the at least some of the first diverting pulleys in the rigged state to the upper part of the elevator shaft.

18. The method of claim 1, wherein when installing the elevator is completed, the first rope portions are not directly above the elevator car.

19. The method of claim 1, wherein the hoisting rope or the two or more parallel hoisting ropes pass above the elevator car only directly between the plurality of third diverting pulleys and the plurality of fourth diverting pulleys, and wherein the plurality of third diverting pulleys and the plurality of fourth diverting pulleys are fixed to a beam, which is fixed to a top side of the elevator car, the beam extending between the car guide rails.

20. An elevator, comprising:
car guide rails;
an elevator car;
a hoisting rope or two or more parallel hoisting ropes;
a traction sheave configured to be disposed in a first location that is fixed relative to an elevator shaft of the elevator;
a compensating system configured to be disposed in a second location that is fixed relative to the elevator shaft;
a plurality of first diverting pulleys in an upper part of the elevator shaft;
a plurality of second diverting pulleys in a lower part of the elevator shaft;
a plurality of third diverting pulleys on the elevator car; and
a plurality of fourth diverting pulleys on the elevator car;
wherein, when installed, the traction sheave moves the elevator car using the hoisting rope or two or more parallel hoisting ropes,
wherein, when installed, the hoisting rope has first rope portions going upward from the third diverting pulleys to the first diverting pulleys or the two or more parallel hoisting ropes have first rope portions going upward from the third diverting pulleys to the first diverting pulleys,
wherein, when installed, the hoisting rope has second rope portions going downward from the fourth diverting pulleys to the second diverting pulleys or the two or more parallel hoisting ropes have second rope portions going downward from the fourth diverting pulleys to the second diverting pulleys,
wherein, when installed, the compensating system causes a first rope tension in the first rope portions,
wherein, when installed, the compensating system causes a second rope tension in the second rope portions,
wherein, when installed, the compensating system compensates rope elongations in the first and second rope portions so as to maintain a ratio of the first rope tension to the second rope tension substantially constant,
wherein, when installed, at least some of the first diverting pulleys have been rigged in the lower part of the elevator shaft,
wherein, when installed, at least some of the third diverting pulleys have been rigged in the lower part of the elevator shaft,
wherein, when installed, the at least some of the first diverting pulleys, rigged in the lower part of the elevator shaft, have been raised in the rigged state to the upper part of the elevator shaft,
wherein, when installed, the rigged and raised first diverting pulleys have been mounted in place,
wherein, when installed, the first rope portions are not directly above the elevator car, and
wherein, when installed, the plurality of first diverting pulleys are mounted directly to the car guide rails or each of the plurality of first diverting pulleys are mounted to the car guide rails via a separate supporting element.

21. The elevator of claim 20, wherein the elevator is an elevator without machine room.

22. The elevator of claim 20, wherein the elevator is an elevator without counterweight.

23. The elevator of claim 20, wherein all of the first diverting pulleys have been rigged in the lower part of the elevator shaft.

24. The elevator of claim 20, wherein all of the third diverting pulleys have been rigged in the lower part of the elevator shaft.

* * * * *